US005831416A

United States Patent [19]

Fisher

[11] Patent Number: 5,831,416

[45] Date of Patent: Nov. 3, 1998

[54] APPARATUS AND METHOD FOR CHARGING BATTERIES

[75] Inventor: Jeffrey Lewis Fisher, Austin, Tex.

[73] Assignee: Galvanix Corporation, Austin, Tex.

[21] Appl. No.: 988,483

[22] Filed: Dec. 10, 1997

[51] Int. Cl.[6] .......................... H01M 10/44; H01M 10/46

[52] U.S. Cl. .......................... 320/132; 320/137; 320/158

[58] Field of Search .................................... 320/128, 132, 320/134, 136, 137, 158, 161, 165, DIG. 12, DIG. 21, 108, 110, 111, 112, 147, 148

[56] References Cited

U.S. PATENT DOCUMENTS

| | | | |
|---|---|---|---|
| 2,976,475 | 3/1961 | Dodge | 323/9 |
| 3,399,338 | 8/1968 | Bergert et al. | 323/9 |
| 3,819,986 | 6/1974 | Fukuoka | 317/16 |
| 3,886,410 | 5/1975 | Seer, Jr. | 317/31 |
| 3,924,158 | 12/1975 | Farnsworth | 317/31 |
| 4,884,161 | 11/1989 | Atherton et al. | 361/18 |
| 4,899,098 | 2/1990 | Gariboldi | 323/277 |
| 4,982,149 | 1/1991 | Shimanuki | 323/274 |

*Primary Examiner*—Edward Tso

*Attorney, Agent, or Firm*—Russell D. Culbertson; Shaffer & Culbertson

[57] ABSTRACT

A battery charging apparatus (12) includes a voltage regulator arrangement (14), a charging transistor (16), a switching transistor (18), and preferably an operational status indicating arrangement (20). The voltage regulator arrangement (14) receives an input voltage signal from a voltage source (22) and produces a regulated voltage output to be applied to a battery (10) to be charged. The charging transistor (16) is connected with its collector-emitter current path completing a charging circuit from the voltage regulator arrangement (14) through the battery (10) to be charged and is forward biased in normal operation by a signal derived from the regulated voltage output. A switching transistor (18) has its collector-emitter current path connected in parallel with the battery (10) and collector-emitter current path of the charging transistor (16) to complete a bypass circuit around the battery. The base of the switching transistor (18) is connected to receive a biasing signal derived from the voltage at a reference point between the battery (10) and the collector-emitter current path of the charging transistor (16). In a short circuit or reverse polarity condition across the battery connecting terminals (26, 28), the voltage signal applied to the base of the switching transistor (18) causes the switching transistor (18) to conduct, reducing the voltage signal applied to the base of the charging transistor (16) and causing the charging transistor (16) to become non-conductive across its collector-emitter current path. By turning off the charging transistor (16) in the reverse polarity or short circuit condition, the apparatus (12) protects the charging transistor (16) and the voltage regulator arrangement (14) from an over current condition.

10 Claims, 1 Drawing Sheet

APPARATUS AND METHOD FOR CHARGING BATTERIES

BACKGROUND OF THE INVENTION

This invention relates to an apparatus and method for charging batteries or supplying power to an electrical load.

Many types of batteries may be recharged with specialized power supply circuits in which the battery to be recharged represents the load for the circuit. These specialized power supply circuits or battery chargers commonly required failure prone components such as mechanical relays, mechanical circuit breakers, and electrolytic capacitors. These components limit the durability and operational life of these prior chargers.

In order for a charging device to operate properly and safely, the battery to be charged must be connected with the proper polarity. Connecting the battery with an incorrect polarity, or a short circuit across the battery connecting terminals, not only prevents the battery from charging, but may also damage the charging circuit. It is, therefore, desirable to provide a battery charging apparatus with means for indicating when a battery is properly connected and charging. It is also desirable for the charging apparatus to be sufficiently robust and durable to withstand short circuits across the battery connecting terminals or a reverse polarity condition without damaging the various components of the apparatus.

Certain types of batteries, particularly lead acid batteries undergo sulfation after a period of time. Sulfation is a process in which lead sulfate deposits accumulate on the battery plates and partially cover plate surfaces. These sulfate deposits create a high impedance to the flow of ions, and limit the energy capacity of the battery. Charging such batteries with rapid, short duration pulses of charging current helps prevent sulfation and may even reverse sulfation to some extent. It is, therefore, desirable for a charging apparatus to provide charging current in rapid, short duration pulses.

SUMMARY OF THE INVENTION

It is a broad object of the invention to provide a battery charging apparatus and method which overcomes the above described problems associated with prior chargers.

These objects are accomplished in an apparatus having a pair of power transistors providing alternate current paths, a charging circuit and a bypass circuit. The apparatus includes a voltage regulating arrangement connected to receive an input voltage signal from a voltage source and produce a regulated voltage output to be applied to the battery to be charged. A charging transistor is connected with its collector-emitter current path in series with the battery to be charged so that the collector-emitter current path of the charging transistor completes a charging circuit. A charging transistor biasing signal derived from the regulated voltage output is applied to the base of the charging transistor.

To provide an alternate or bypass current path, a switching transistor is connected with its collector-emitter current path in parallel with the battery and the collector-emitter current path of the charging transistor. The collector-emitter current path of the switching transistor completes a bypass circuit for the regulated voltage output allowing current to bypass the collector-emitter current path of the charging transistor. The base of the switching transistor is connected to receive a switching transistor biasing signal derived from the voltage applied to the collector-emitter current path of the charging transistor.

In operation, when a battery is properly connected to battery connecting terminals associated with the apparatus, the voltage signal applied to the base of the switching transistor is insufficient to forward bias the transistor, leaving the collector-emitter current path of the switching transistor in a non-conductive state. At the same time, the voltage signal applied to the base of the charging transistor provides a forward bias for the charging transistor, allowing the transistor to conduct along its collector-emitter current path. In the conductive state, the collector-emitter current path of the charging transistor completes the charging circuit through the battery allowing current to flow through and charge the battery.

When the battery is connected with reverse polarity across the connecting terminals, or if a short circuit exists across the connecting terminals, the switching transistor biasing signal applied to the switching transistor base is sufficient to forward bias a switching transistor. The now conductive collector-emitter current path of the switching transistor completes the bypass circuit, and reduces the voltage signal to the base of the charging transistor leaving its collector-emitter current path in a non-conductive condition. This non-conductive condition protects the charging transistor as well as the other components of the charging apparatus from overloading. However, when the battery is again connected properly to the connecting terminals, the charging device resumes normal charging operation.

The charging apparatus according to the invention also preferably includes an arrangement for providing status signals indicating the operational status of the device. The preferred status signal arrangement includes a charging LED connected in a circuit through the collector-emitter current path of the charging transistor. The charging LED conducts to produce a charging signal when the battery is properly connected and charging. The status signal arrangement also preferably includes a full charge LED also connected through the collector-emitter current path of the charging transistor. The full charge LED is controlled to operate only when the battery is fully charged.

The power transistor arrangement of the charging apparatus provides a safe shut-down in response to a battery improperly connected to the battery connecting terminals or to a short circuit across the connecting terminals. The apparatus automatically recovers to normal operation when the reverse polarity or short circuit condition is removed and the battery to be charged is properly connected. The reverse polarity and short circuit protection features of the charging apparatus are effected without using capacitors, relays, and other relatively failure prone components. Furthermore, signals provided by the status indicating arrangement indicate when the battery is properly connected and charging as well as when the properly connected battery is fully charged. The absence of the charging and full charge signals indicate that a connected battery is not properly connected to the charging apparatus.

These and other objects, advantages, and features of the invention will be apparent from the following description of the preferred embodiments, considered along with the accompanying drawing.

DESCRIPTION OF THE PREFERRED EMBODIMENTS

Figure 1:
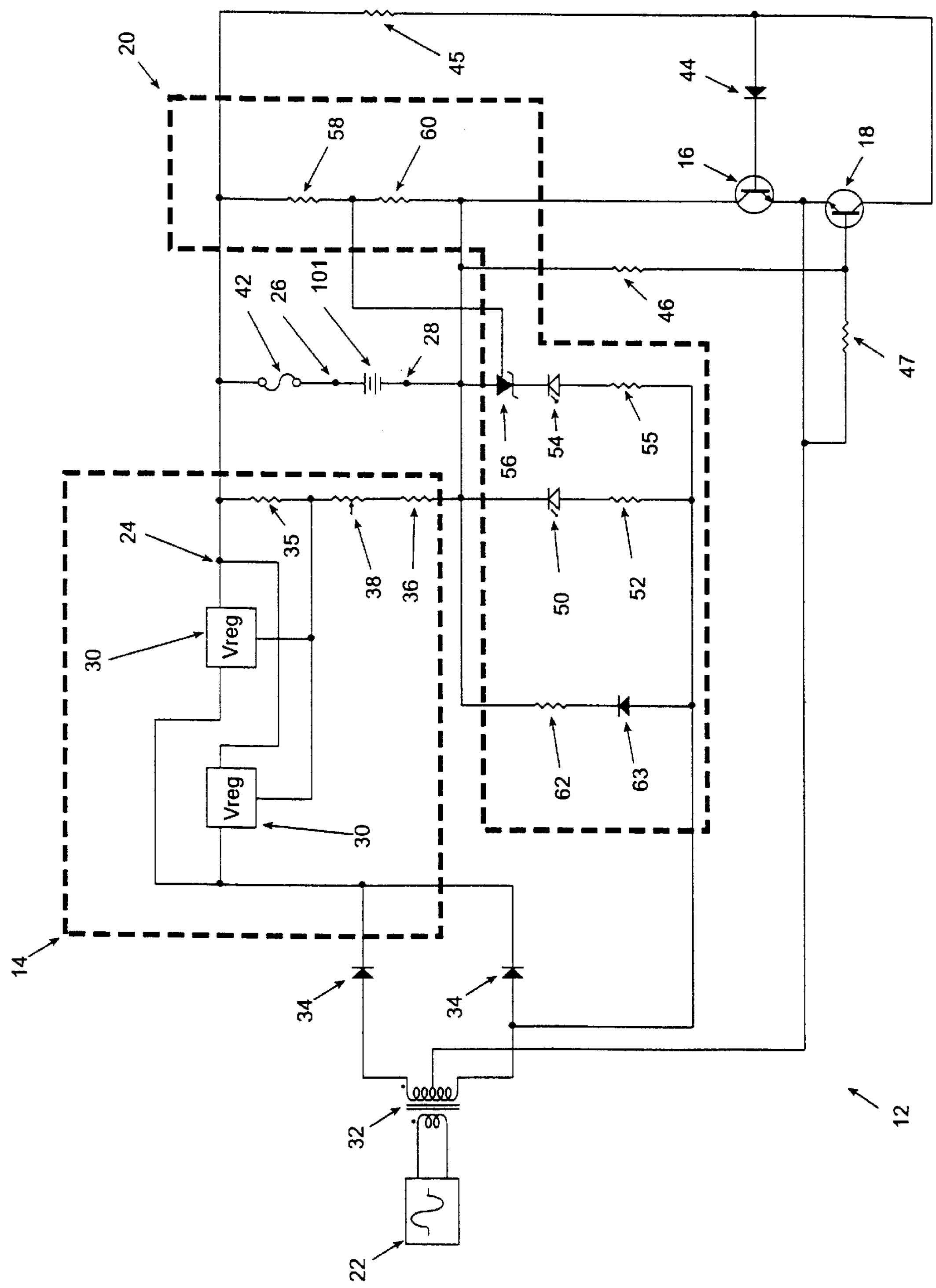
FIG. 1 is an electrical schematic drawing of a battery charging apparatus embodying the principles of the invention.

As illustrated in FIG. 1, the invention is particularly adapted for charging a rechargeable battery 10. Although the invention is illustrated as a battery charging apparatus 12, those skilled in the art will readily appreciate that the principles of the invention may be applied to any power supply. In the power supply application, the electrical load on the power supply takes the place of the battery 10 being charged shown in FIG. 1.

The apparatus 12 includes a voltage regulator arrangement or means 14, power transistors 16 and 18, and an operational status arrangement or means 20. The voltage regulator arrangement 14 receives an input voltage signal from a voltage source 22 and produces a regulated voltage output at point 24. The regulated voltage output is applied to the battery 10 to be charged when connected properly across connecting terminals 26 and 28. Power transistors 16 and 18 function to break a charging circuit in the event of a short circuit across the connecting terminals 26 and 28 or, if the battery 10 is connected improperly with reversed polarity. Normal operation is resumed immediately when the battery 10 is once again connected properly. The operational status arrangement 20 provides an indication when the battery is charging, and preferably, an indication when the battery is fully charged.

The voltage regulator arrangement 14 comprises at least one linear voltage regulator 30. The illustrated apparatus 12 shows two voltage regulators 30 connected in parallel. Each voltage regulator 30 is connected to receive the voltage input from the voltage source 22. Any number of voltage regulators 30 may be used depending upon the current required for the particular application. Thus, the invention is scalable by varying the number of voltage regulators to match the desired current. Regardless of the number of regulators 30 used for a particular application, the voltage regulators operate to receive the input voltage from the voltage source and produce an output reduced to a desired maximum voltage level. Any suitable voltage regulators may be employed in the apparatus 12, including a model LM 317 variable voltage regulator by National Semiconductors, for example.

The illustrated form of the invention uses an alternating current voltage source 22 applied through transformer 32. The applied AC signal is rectified by rectifying diodes 34 to produce a full wave rectified AC signal. Those skilled in the art will readily appreciate that any half wave or full wave rectifying arrangement may be utilized within the scope of the invention. Also, rather than an alternating current voltage source, the invention may utilize a pulsed DC signal or even a constant DC signal. The AC or pulsed DC signals are preferred for the beneficial effect they produce in batteries prone to sulfation.

The voltage regulator arrangement 14 also preferably includes a voltage divider with resistors 35 and 36 and a variable resistance element 38. The variable resistance element 38 may be adjusted to provide a desired voltage reference signal back to the voltage regulators 30 through reference signal lead 40. This reference signal sets the maximum regulated voltage output from the voltage regulators 30.

The regulated voltage output is preferably applied to the battery 10 via a fuse 42 connected in series with the battery. The fuse 12 provides additional over current protection for the various components of the apparatus 12.

The power transistors comprise a charging transistor 16 and a switching transistor 18. The charging transistor 16 is connected with its collector-emitter current path completing a charging circuit through the battery 10. A charging transistor biasing signal derived from the regulated voltage output is applied to the base of the charging transistor 16 to forward bias the charging transistor in normal charging operation. Also, a protecting diode 44 is preferably connected to the base of the charging transistor 16 to require a threshold voltage level to forward bias the charging transistor.

The switching transistor 18 is connected with its collector-emitter current path connected in parallel with the battery 10 and the collector-emitter current path of the charging transistor 16. Thus, the collector-emitter current path of the switching transistor completes a bypass circuit around the battery 10 and battery connecting terminals 26 and 28. A current limiting resistor 45 protects the switching transistor 18 when forward biased. The base of the switching transistor 18 is connected to receive a switching transistor biasing signal derived from a reference point between the battery 10 and the collector-emitter current path of the charging transistor 16. Balancing resistors 46 and 47 are used to derive the desired voltage signal at the base of the switching transistor 18.

The operational status means 20 preferably includes a pair of LEDs connected to conduct and provide status indications during certain operational conditions. A charge indicating LED 50 is connected to receive voltage from an output terminal 51 of the transformer 22 and is protected by current limiting resistor 52. The charge indicating LED 50 is biased forward to conduct through the collector-emitter current path of the charging transistor 16 when the battery 10 is properly connected as shown in the Figure.

A full charge indicating LED 54 is connected similarly to the charge indicating LED 50 and protected by a current limiting resistor 55. However, a shunt regulator 56 is connected in series with the full charge indicating LED 54. The shunt regulator 56 receives a voltage signal produced between a pair of scaling resistors 58 and 60 connected in parallel with the battery 10 being charged. The scaling resistors 58 and 60 are chosen so that the voltage between them represents the reference voltage of the shunt regulator 56 when the battery 10 is fully charged. Thus, when the battery 10 is properly connected and fully charged, the shunt regulator 56 conducts and allows the full charge indicating LED 54 to produce a full charge indicating signal. An additional resistor 62 and diode 63 are connected in parallel with the LEDs 50 and 54 to protect the LEDs from excessive current.

The operation of the apparatus 12 and method of the invention may now be described with reference to the drawing FIGURE. When the battery 10 is properly connected, as shown in the drawing, and power is supplied through the transformer 32, the charging transistor biasing signal is applied to the base of the charging transistor 16 to forward bias the charging transistor on each voltage pulse through the voltage regulators 30. At the same time, the signal to the base of the switching transistor 18 is insufficient to forward bias the switching transistor and, thus, the entire regulated voltage output pulse is applied to the battery 10 through the connecting terminals 26 and 28. Also, the voltage applied to the charge indicating LED 50 produces a charge indication showing that the battery 10 is properly connected and being charged. Once the battery 10 is fully charged, the shunt regulator 56 conducts to allow the full charge indicating LED 54 to operate and provide a signal indicating that the battery is fully charged.

When the battery is connected improperly with reverse polarity across connecting terminals 26 and 28, or if a short circuit exists across the connecting terminals, the switching transistor biasing signal is applied through resistor 45 to the base of the switching transistor 18, forward biasing the switching transistor and allowing it to conduct through its collector-emitter current path. Conduction through the collector-emitter current path of the switching transistor 18 effectively reduces the voltage signal to the base of the charging transistor 16 causing the collector-emitter current path of the charging transistor to become non-conducting. Current continues to flow through the collector-emitter current path of the switching transistor 18 until the reverse polarity or short circuit condition is removed. Thus, in the short circuit or reverse polarity condition, the charging transistor 16 and regulators 30 are protected from excessive current. Yet when the short circuit or reverse polarity condition is removed and the battery 10 is once again connected properly, the apparatus 12 automatically recovers and operates normally to charge the battery.

The above described preferred embodiments are intended to illustrate the principles of the invention, but not to limit the scope of the invention. Various other embodiments and modifications to these preferred embodiments may be made by those skilled in the art without departing from the scope of the following claims. For example, any suitable transistors may be used for the power transistors 16 and 18. NPN transistors are used where the input polarity is negative whereas PNP transistors are used when the input polarity is positive. Also, additional power transistor pairs may be added in parallel to accommodate higher currents. Furthermore, other alternative operational status arrangements may be employed to provide the desired operational status indications.

I claim:

1. An apparatus for charging a battery, the apparatus comprising:

(a) voltage regulator means for receiving a voltage input signal from a voltage source and producing a regulated voltage output to be applied to the battery when the battery is properly connected across a pair of connecting terminals;

(b) a charging transistor having a collector-emitter current path connected to complete a charging circuit for the regulated voltage output through the battery when the battery is properly connected, and further having a base connected to receive a charging transistor biasing signal derived from the regulated voltage output;

(c) a switching transistor having a collector-emitter current path connected in parallel with the connecting terminals and the collector-emitter current path of the charging transistor to complete a bypass circuit for the regulated voltage output, the switching transistor further having a base connected to receive a switching transistor biasing signal derived from a reference point between the battery and the collector-emitter current path of the charging transistor so that the collector-emitter current path of the switching transistor is biased to conduct in response to a short circuit or reverse polarity condition across the connecting terminals, thereby removing the charging transistor biasing signal from the base of the charging transistor; and (d) operational status means for providing a status signal indicating the operational status of the apparatus.

2. The apparatus of claim 1 wherein the operational status means comprises:

(a) a charge indicating LED connected to complete a charge indicating circuit from the voltage source through the collector-emitter current path of the charging transistor and adapted to provide a charging indication when the battery to be charged is properly connected to the connecting terminals;

(b) a full charge LED connected to complete a full charge indicating circuit from the voltage source through the collector-emitter current path of the charging transistor; and (c) a shunt regulator connected in the full charge indicator circuit in series with the full charge LED and adapted to conduct in response to a full charge reference voltage signal produced between a scaling resistor pair when the battery charged is fully charged and properly connected across the connecting terminals, the scaling resistor pair being connected in parallel with the connecting terminals.

3. The apparatus of claim 1 wherein the voltage regulator means comprises:

(a) at least one voltage regulator; and (b) a float variable resistance element connected in parallel with the connecting terminals; and (c) a voltage reference signal line connected to a point between the regulated voltage means and the float variable resistance element and extending to a reference input associated with each voltage regulator to provide a voltage control reference signal to each voltage regulator, the voltage control reference signal controlling the level of the regulated voltage output.

4. The apparatus of claim 1 further including:

(a) a protection diode having a cathode connected to the base of the charging transistor for providing a forward biasing threshold for the charging transistor.

5. The apparatus of claim 1 wherein the input voltage signal is a rectified alternating current signal and the apparatus includes:

(a) a transformer; and (b) a rectifying arrangement connected to output terminals of the transformer.

6. The apparatus of claim 1 further comprising:

(a) a current limiting fuse connected in series in the charging circuit between the voltage regulator means and the connecting terminals.

7. A method for charging a battery, the method comprising the steps of:

(a) regulating a voltage input signal from a voltage source to produce a regulated voltage output to be applied to the battery when the battery is properly connected across a pair of connecting terminals;

(b) applying a charging transistor biasing signal derived from the regulated voltage output to the base of a charging transistor so as to forward bias the charging transistor, a collector-emitter current path of the charging transistor being connected in series with the battery so as to complete a charging circuit for the regulated voltage output through the battery;

(c) applying a switching transistor biasing signal derived from the voltage at a reference point between the battery and the collector-emitter current path of the charging transistor to a base of a switching transistor, the switching transistor also having a collector-emitter current path connected in parallel with the battery and the collector-emitter current path of the charging transistor and completing a bypass circuit around the battery, the switching transistor being forward biased in response to a short circuit or reverse polarity condition across the connecting terminals so as to remove the charging transistor biasing signal from the base of the charging transistor; and (d) providing a signal indicating the operational status across the connecting terminals.

8. The method of claim 7 wherein the step of providing a signal indicating the operational status across the connecting terminals comprises:

(a) applying a voltage signal from the voltage source to a charge indicating LED to forward bias the charge indicating LED when the battery is properly connected across the connecting terminals;

(b) applying a full charge reference signal to forward bias a shunt regulator when the battery is fully charged and properly connected to the connecting terminals; and (c) applying a voltage from the voltage source to a full charge indicating LED connected in series with the shunt regulator to forward bias the full charge indicating LED when the battery is properly connected across the connecting terminals and is fully charged.

9. The method of claim 7 further comprising the step of:

(a) isolating the base of the charging transistor from a voltage below a threshold voltage level.

10. The method of claim 7 wherein the voltage input signal comprises a rectified AC signal.

* * * * *